March 23, 1965  M. FRIEDLAND ETAL  3,174,378
TURRET PUNCH PRESS WITH SUPPORT MEMBER
FOR INTERCHANGEABLE DRIVE MEANS
Filed April 26, 1963  9 Sheets-Sheet 1

INVENTORS
Martin Friedland
Frederick W. Schneider
BY Lucius Earl Thomas
ATTORNEYS

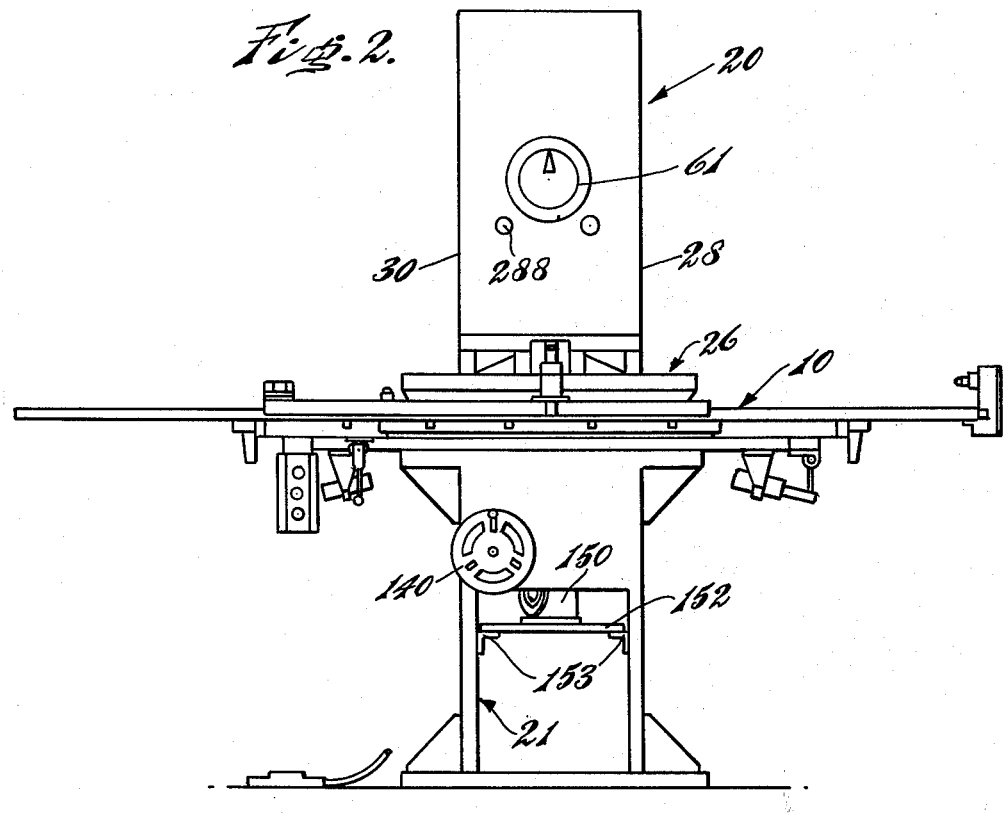

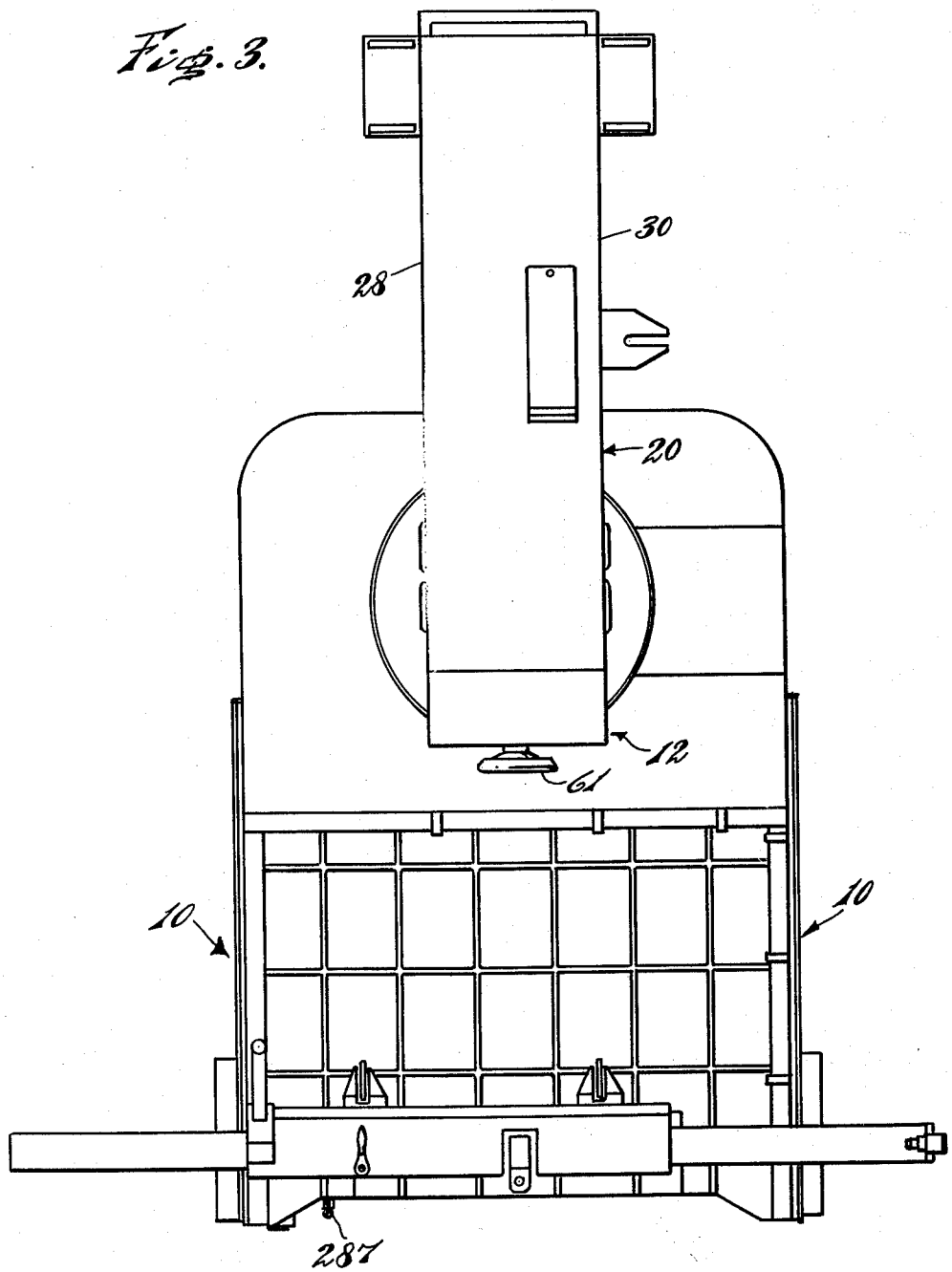

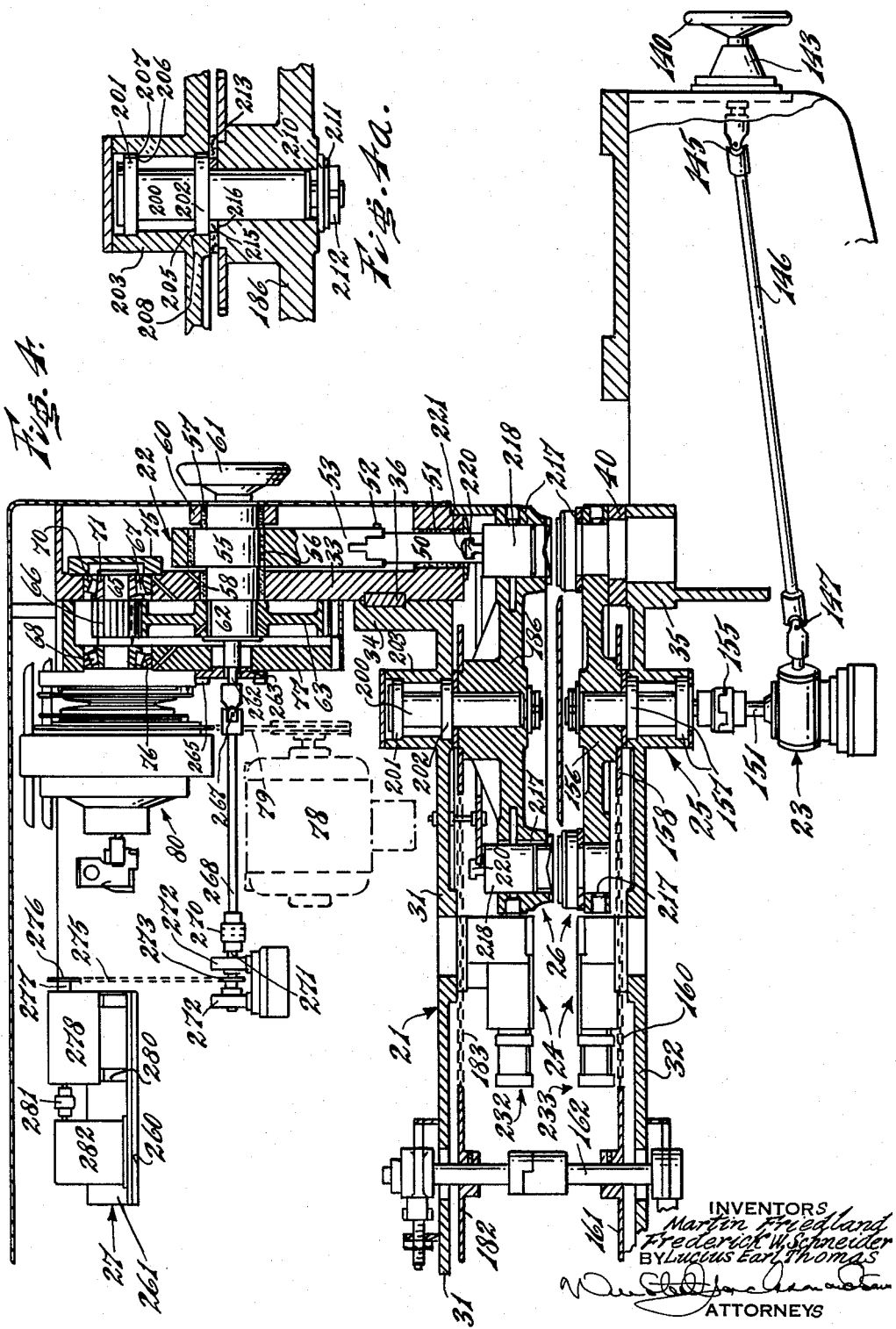

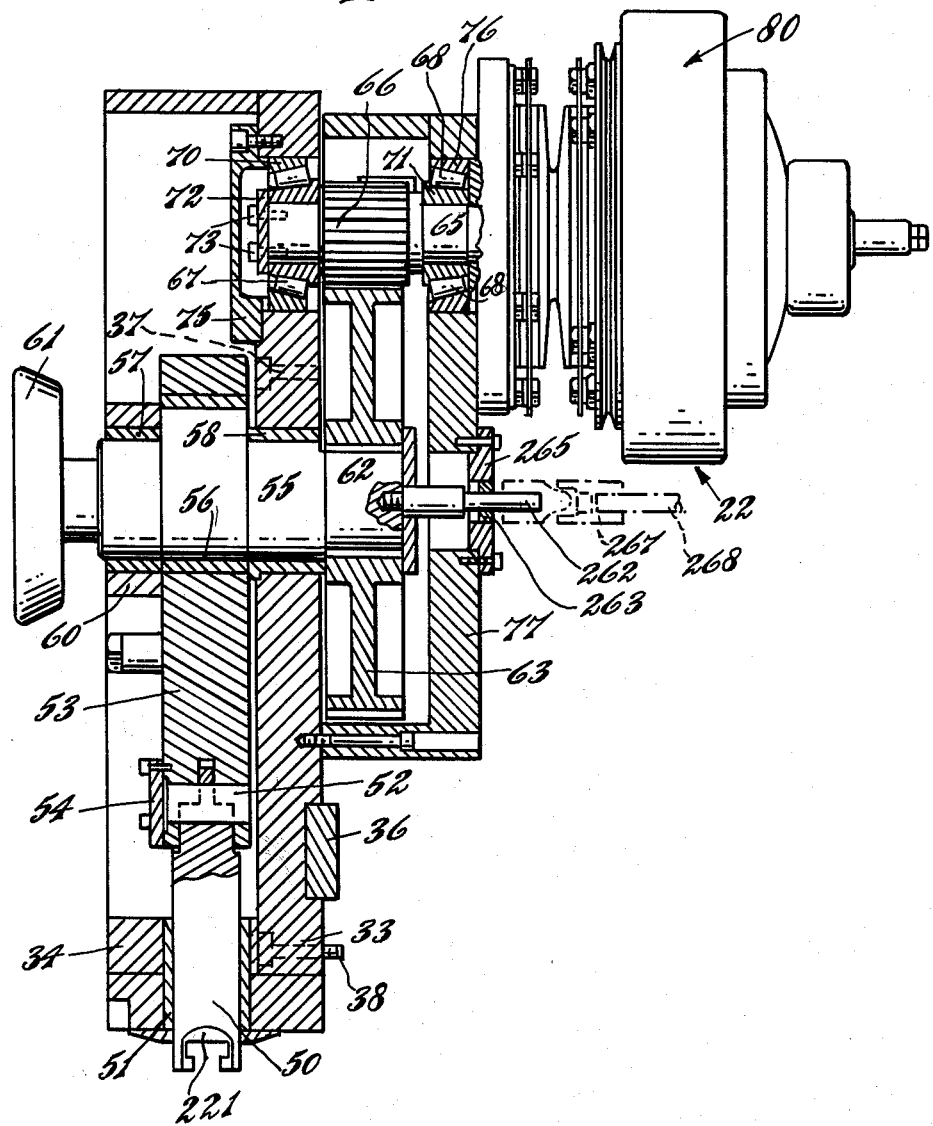

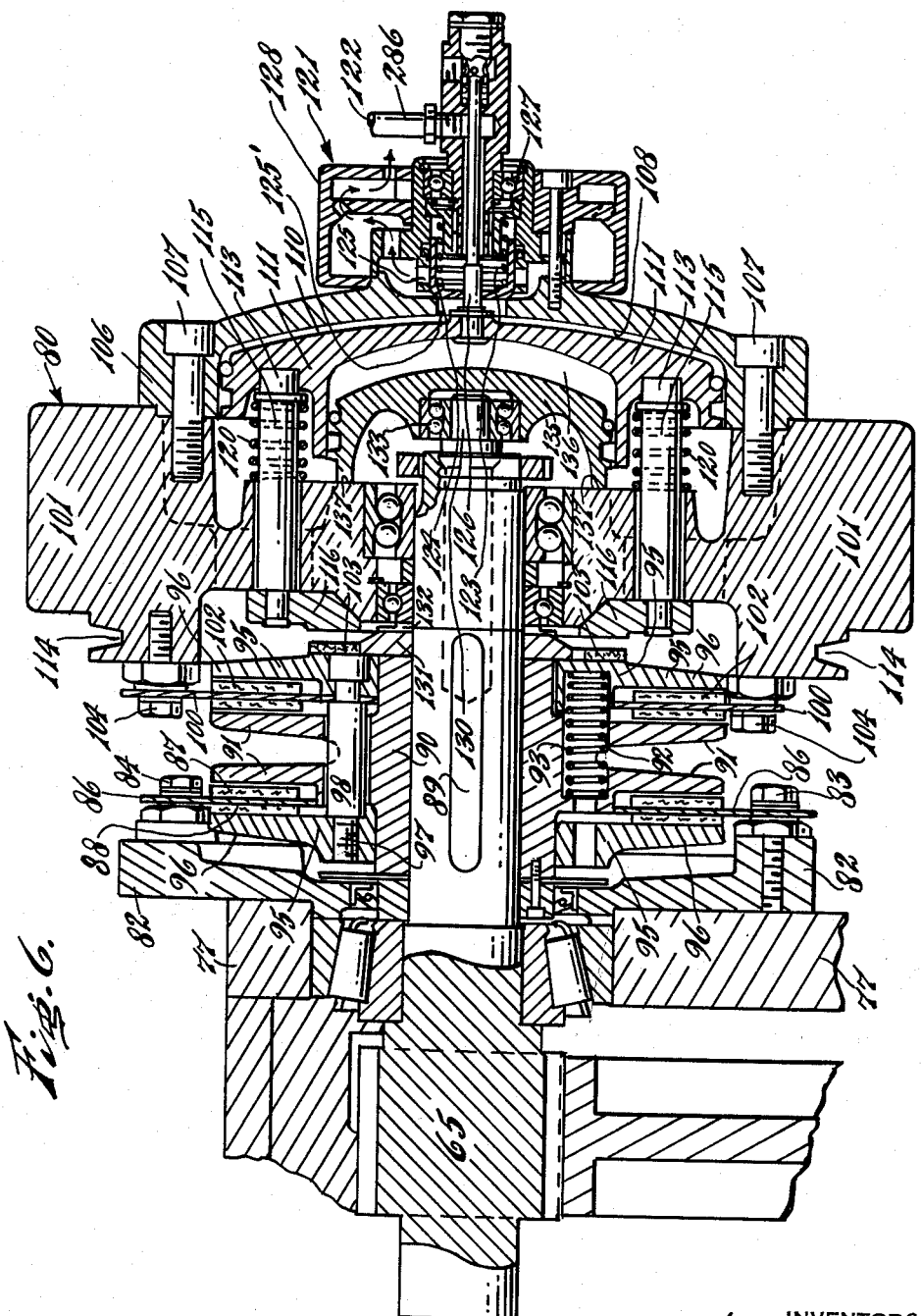

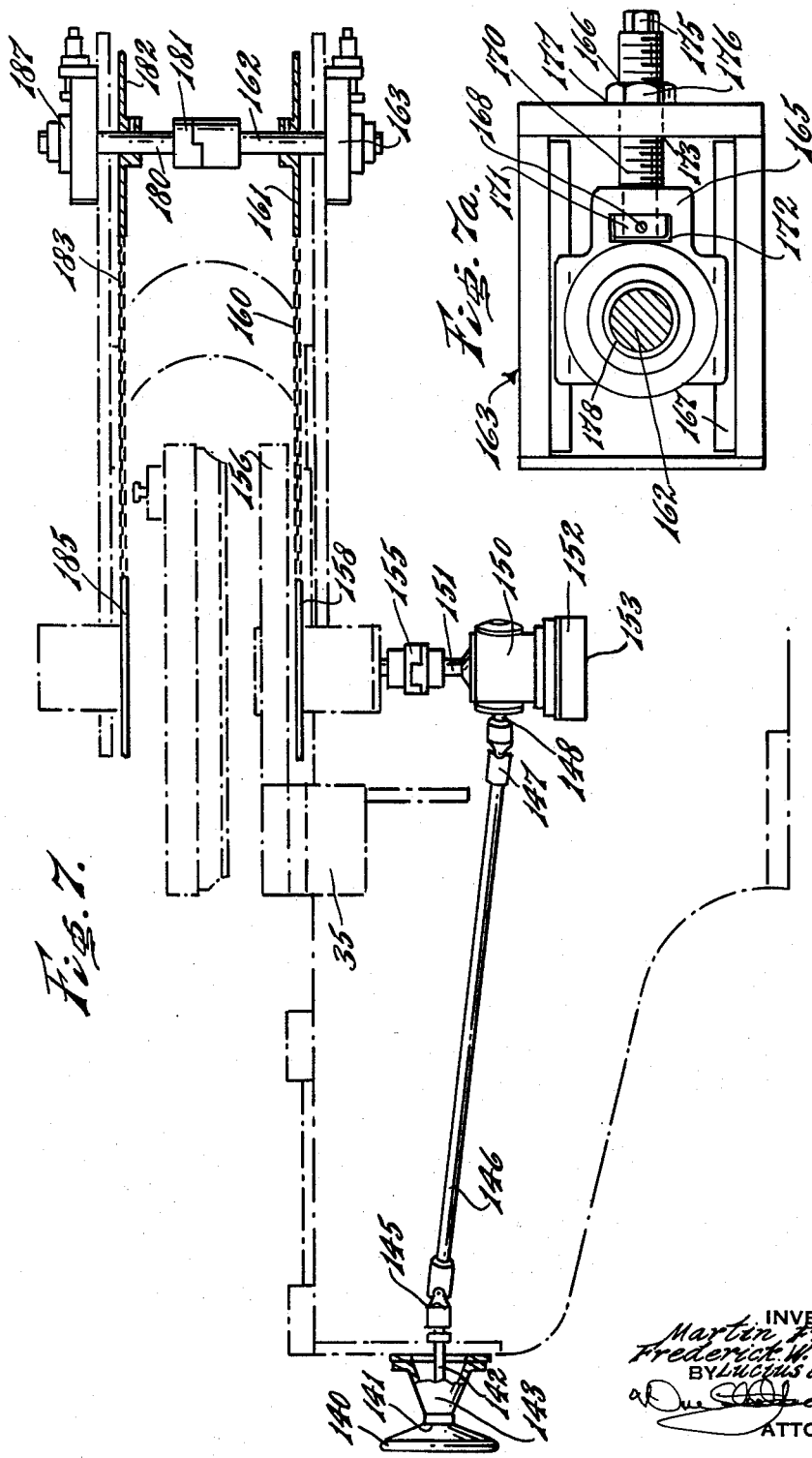

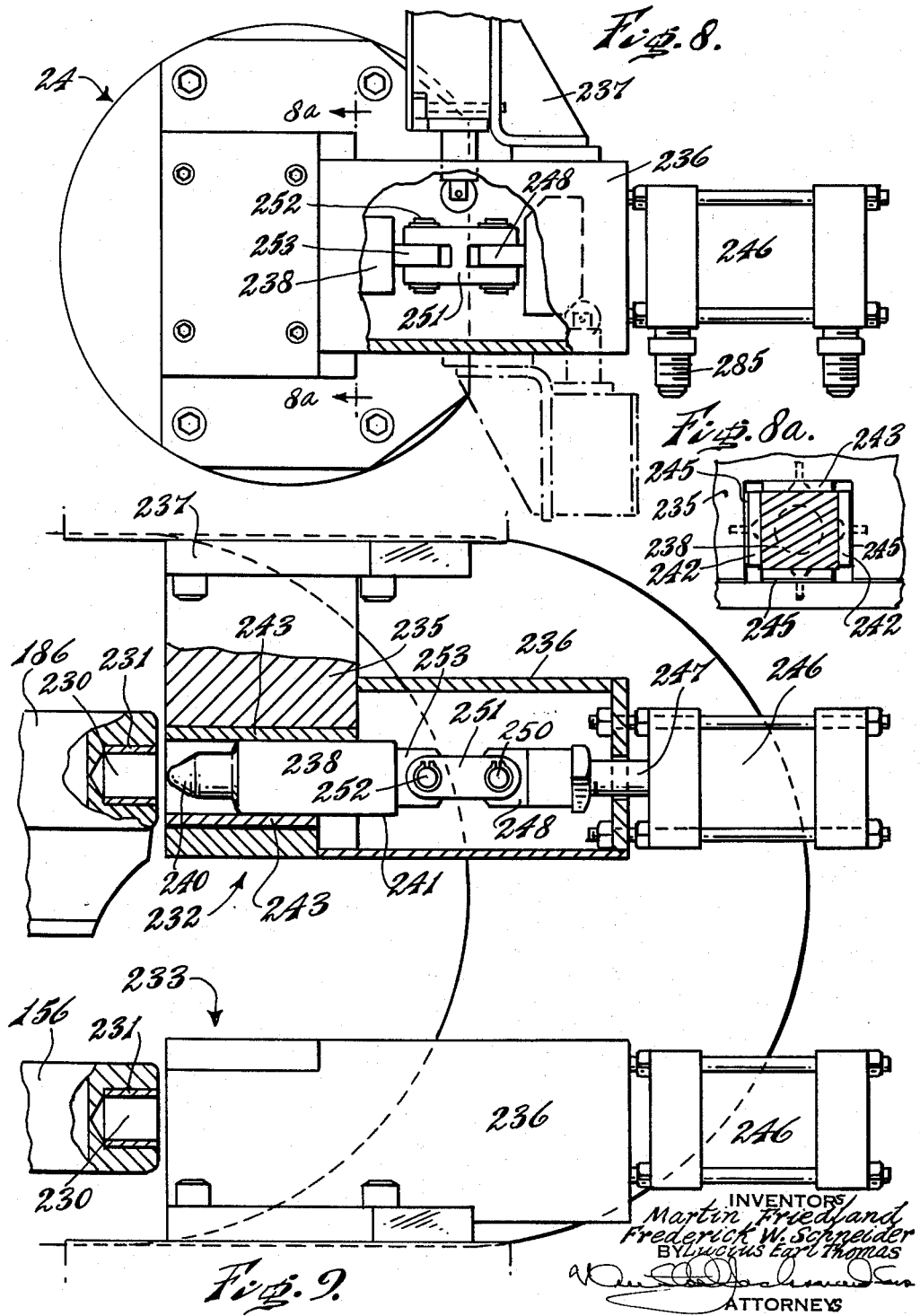

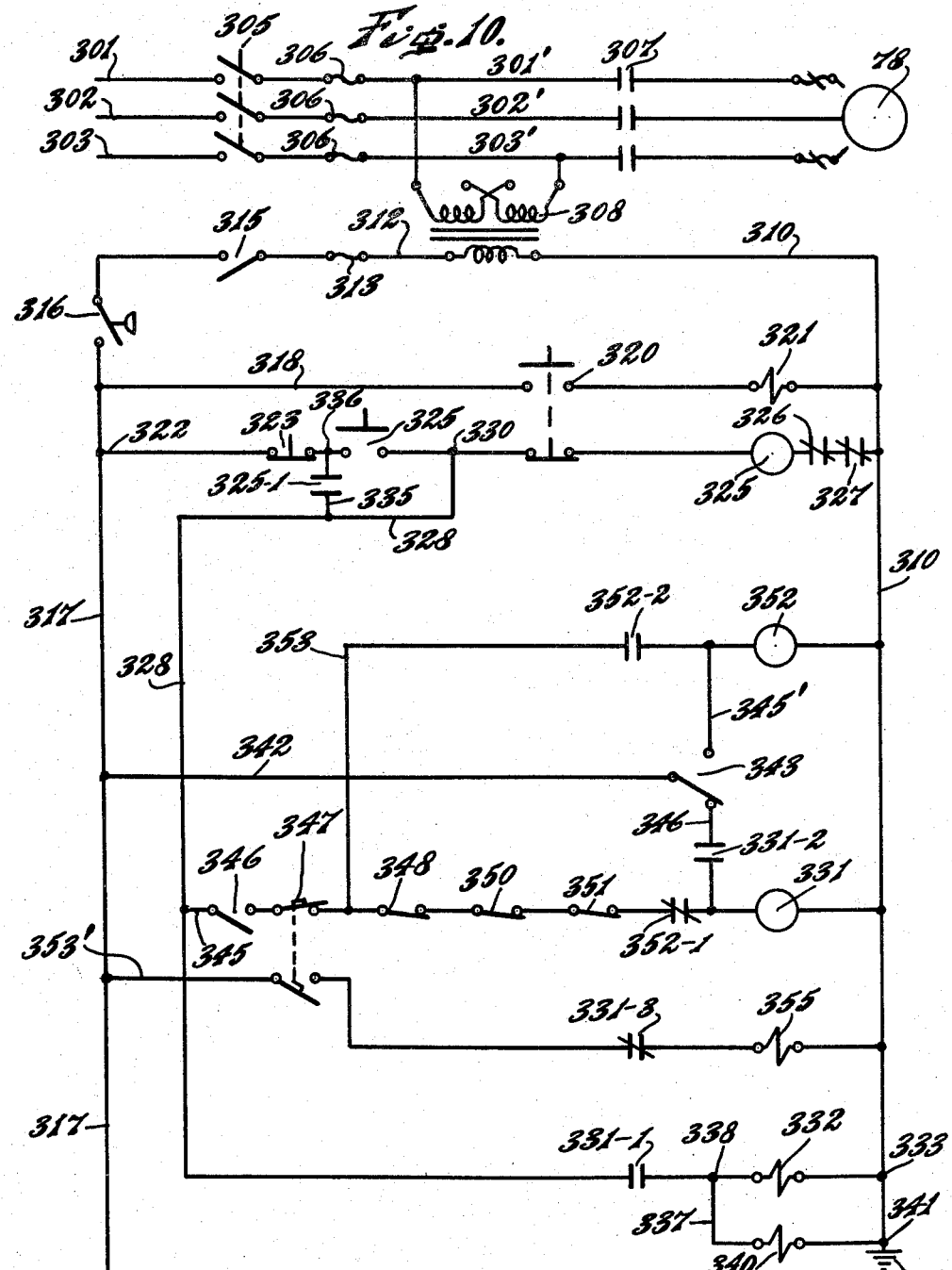

United States Patent Office 3,174,378
Patented Mar. 23, 1965

3,174,378
TURRET PUNCH PRESS WITH SUPPORT MEMBER FOR INTERCHANGEABLE DRIVE MEANS
Martin Friedland, Flourtown, Frederick W. Schneider, Levittown, and Lucius Earl Thomas, Norristown, Pa., assignors, by mesne assignments, to The Warner & Swasey Company, Cleveland, Ohio, a corporation of Ohio
Filed Apr. 26, 1963, Ser. No. 275,871
8 Claims. (Cl. 83—526)

The present invention relates to high speed punch presses and more particularly to turret punch presses.

A purpose of the invention is to provide a turret punch press composed of a plurality of prefabricated assemblies.

A further purpose is to provide a turret punch press which utilizes standardized interchangeable main assemblies.

A further purpose is to provide a turret punch press having a plurality of tonnage capacities and throat dimensions using the same press assemblies.

A further purpose is to utilize a self-aligning punch and die assembly in a turret punch press.

A further purpose is to utilize a key arrangement for transmitting the entire upward vertical forces from the press drive assembly to the frame.

A further purpose is to drive the lower turret directly from a manual or power driver and then transmit the rotation of the lower turret to the upper turret.

A further purpose is to utilize take-up assemblies for controlling the tension in the turret drive assemblies.

A further purpose is to use air actuated index pins to rotationally position the turret.

A further purpose is to utilize index pins having a rectangular cross section in the sliding portion.

A further purpose is to utilize a longitudinally extending crankshaft supported in a front support plate keyed to the frame.

A further purpose is to provide a table support section in the frame.

A further purpose is to use air to engage and disengage the brake and clutch combination.

A further purpose is to drive the lubrication pump from the main crankshaft.

A further purpose is to provide an interlock position in the clutch-brake combination wherein the main crankshaft is free to rotate independently of the clutch or the brake.

A further purpose is to reduce the length of the crankshaft.

A further purpose is to reduce the length of the drive shaft.

A further purpose is to support the clutch-brake assembly from the main drive support.

A further purpose is to support the turrets in tapered roller bearings held in housings welded to the side frame.

A further purpose is to support the turrets, the turret drive, the crankshaft, the press drive, and the ram from two horizontal cross plates and one vertical cross plate in a press frame.

A further purpose is to utilize a welded press frame.

A further purpose is to maintain a given punch capacity when the throat of the frame is deepened by using flat welded frame reinforcement.

A further purpose is to provide for alternate capacity presses with the same frame.

A further purpose is to include all the press assemblies within the press frame.

A further purpose is to maintain accuracy of the turret mountings by the use of roller bearings.

A further purpose is to provide a construction wherein a work positioning structure can be readily supported from the press frame.

A further purpose is to provide bench assembly of the clutch-brake combination.

A further purpose is to provide prealigning, pretesting and preservicing of the clutch-brake combination.

A further purpose is to provide complete interchangeability and substitution and shop repair of drive units.

Further purposes appear in the specification and in the claims.

In the drawings we have chosen to illustrate one only of the numerous embodiments in which our invention may appear, selecting the form shown from the standpoints of convenience in illustration, satisfactory operation and clear demonstration of the principles involved.

FIGURE 2 is a front elevation of the press of the invention.

FIGURE 3 is a plan view of the press of FIGURES 1 and 2.

FIGURE 4 is a fragmentary vertical longitudinal section showing the press drive assembly, the turret assembly and the turret drive assembly.

FIGURE 4a is an enlarged fragmentary vertical section of the turret mounting of the invention.

FIGURE 5 is a partial vertical section showing the press drive assembly.

FIGURE 6 is an enlarged vertical section of the brake-clutch combination.

FIGURE 7 is a vertical section of the turret drive assembly.

FIGURE 7a is an enlarged plan view of the take-up assembly of the invention.

FIGURE 8 is a plan view of the index pin assembly.

FIGURE 8a is a partial section taken on the line 8a—8a of FIGURE 8.

FIGURE 9 is a vertical elevation of the index pin assembly.

FIGURE 10 is a diagrammatic diagram of the electrical system of the invention.

Figure 1:
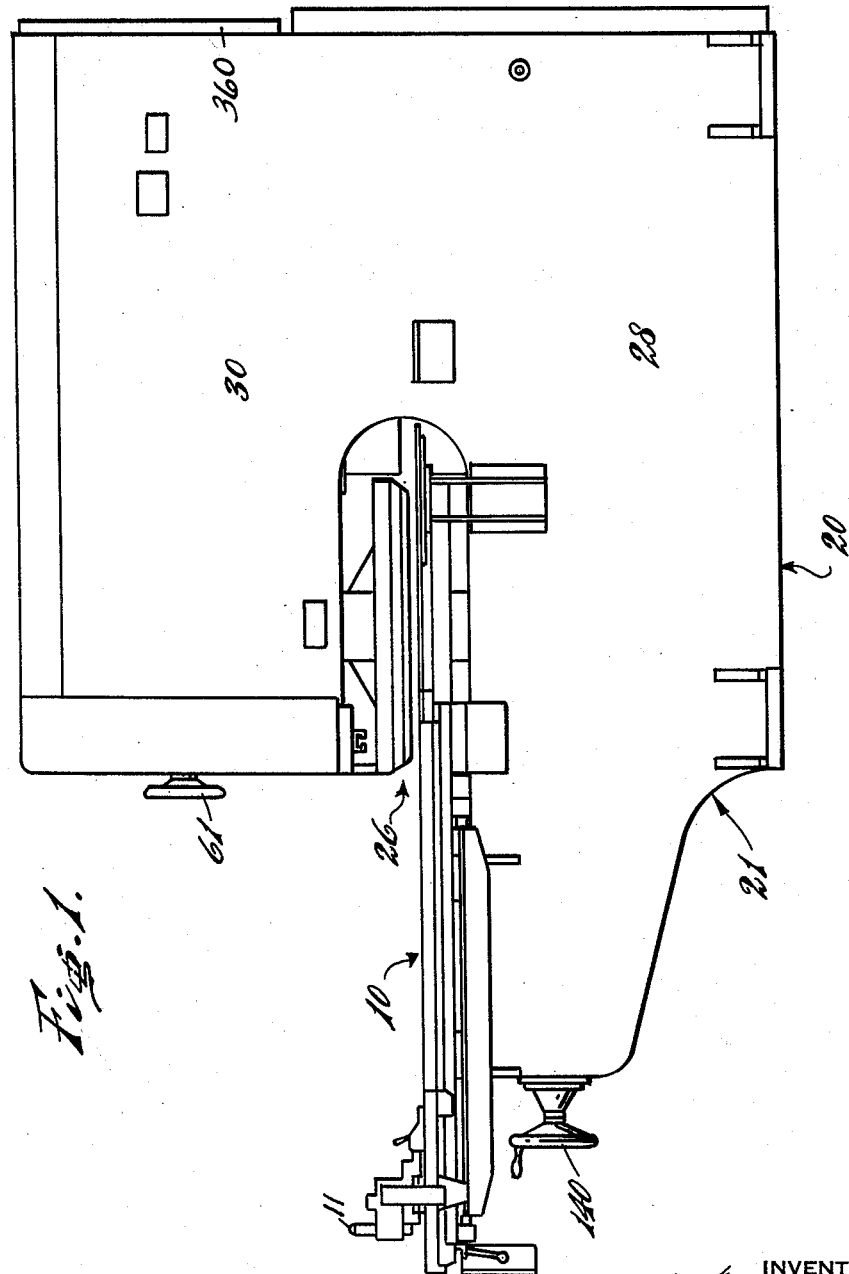
FIGURE 1 is a side elevation of the press of the invention.

Describing in illustration but not in limitation and referring to the drawings:

The turret punch press of the invention is of the type which has a multiplicity of punches and a multiplicity of dies in cooperating turrets which turn to bring any selected punch and die combination to the desired work axis where the operation is to be performed.

In the construction of turret punch presses, special castings are assembled to provide a frame to support the press elements. These elements are then individually mounted in the castings and custom fitted. These elements include cranks, pulleys, belts, gearing, bellcranks and chain links. Whenever repair or replacement of any of these elements was necessary, the individual press elements had to be laboriously disassembled and again reassembled. Hence, both the construction and repair of the press was expensive, inefficient and lengthy. An example of such custom construction is shown in the patent to Wiedemann, United States Patent 2,701,017, granted February 1, 1955.

In the present invention efficient, rapid, more accurate and less expensive construction and maintenance along with more flexible performance is achieved by utilizing prefabricated assemblies including a bench assembled, clutch-brake combination used in the press drive assembly. The press drive assembly is assembled and supported from a single vertical cross member keyed to side plates of a welded prefabricated side frame. The vertical member also journals the ram of the press. The turrets are readily assembled and supported in roller bearings held in housings supported in an upper and lower cross plate which are welded to the vertical side plates. The turrets are rotated to a selected punch and die by a turret drive assembly which drives the lower turret directly and then transmits the motion through sprockets and chains supported from the horizontal cross plates of the frame.

These assemblies can be quickly and easily removed from the press for repair or maintenance, particularly the clutch-brake combination of the press drive assembly which can be substituted with another bench assembled and prepared standard assembly.

A given press along with its press frame of the invention can be rapidly and simply modified to provide for a plurality of capacities, both tonnagewise and throatwise. For instance, the throat can be deepened to provide greater access at the expense of reducing the capacity of the press where there is an excess capacity. On the other hand, the throat can be deepened and the press capacity maintained constant by welding simple side plate reinforcements to the side plates of the frame. Still further, a given press can be increased in capacity with a given throat depth by reinforcing the throat with side plate weldment. These reinforcements can be applied in the initial frame assembly.

Considering now the drawings, the assemblies will be individually described in order to more fully set forth the invention.

PRESS ASSEMBLY

The press assembly 20 comprises the press frame 21, the press drive assembly 22, the turret drive assembly 23, the index pin assembly 24, the turret spindle assembly 25, the turret assembly 26, and a press air and lubrication assembly 27.

Press frame 21

The press frame comprises side plates 28 and 30 which are desirably one integral piece and which are joined by horizontal cross members 31 and 32 and vertical cross members 34 and 35. The horizontal cross members include an upper horizontal cross plate 31 and a lower horizontal cross plate 32 which are welded to the side plates. The vertical cross members include a support 34 for the main drive support member 33, and a support 35 for the bolster 40. The main drive support member is keyed to the vertical cross member 34 and also to the front vertical edges of the side plates and all stress imparted to the punch is transmitted to the frame through the key member 36. The function of the bolts 37 and 38 on the main drive support member is to hold the member horizontally to the side plates wholly since the entire vertical force or thrust is taken through the key to the side plates.

After the turret assembly 26 has been mounted inside the press frame, the bolster 40 is hand-fitted to take up all remaining space between the vertical cross member 35 and the lower turret 156. In this manner all forces imparted to the die are transmitted to the frame through the bolster 40.

The advantages of this unique press frame design are important. Both the press drive assembly 22 and the turret assembly 26 can be bench assembled, pre-tested, aligned, adjusted and run-in on the bench, and only afterwards mounted as ready units inside the press frame. Also, the respective assemblies can easily be replaced in the field in case of damage or wear and such replacement can be accomplished quickly with a minimum of down time.

Press drive assembly 22

A punch ram 50 adapted to move vertically is journalled in a bearing 51 mounted in the main drive support member 33 and is pivoted at its top end at 52 to the pitman 53 which is held in place by a retainer 54. The pitman 53 is journalled on the crankshaft 55 at 56 and converts the rotation of the crankshaft 55 with its throw to a vertical travel of the ram 50. The crankshaft 55 is journalled in sleeve bearings 57 and 58 mounted in the frame 21 at the main drive support member 33 and at a front cross plate 60 at a second point which is also mounted in support 33. A hand wheel 61 is keyed onto the crankshaft 55 at the front thereof. At a rear step portion 62 of the crankshaft 55 a drive gear 63 in the form of a spur gear is keyed thereon. The spur gear 63 is engaged by a drive shaft 65 having a pinion gear 66 either keyed thereon or having spur teeth integral with the drive shaft 65.

The drive shaft 65 at the front is supported by tapered roller bearing 67 having an outer race 70 which engages the main drive support member 33 and is supported thereby and an inner race 71 which engages the drive shaft portion by means of a forced fit. A bearing cap 75 is bolted to the front of the main drive shaft support member 33 to provide an enclosure for the front drive shaft tapered bearing 67.

The drive shaft is supported at the rear of the spur teeth by a tapered bearing 68 in forced fit engagement with the drive shaft and an outer race 76 in forced fit engagement with a gear housing 77 bolted to the main drive support member 33.

In operation, the drive shaft 65 will rotate under the driving engagement with the motor 78 and will mesh with the drive gear 63 whereby the drive shaft 65 will drive gear 63. The drive gear 63 keyed to the crankshaft 55 will rotate the crankshaft, thus imparting a throw to the pitman 53 which will convert the rotational motion of the crankshaft 55 to a longitudinal motion of the fulcrum pin 52. The fulcrum pin 52 will drive the ram 50 which is journalled in the support 33 in a reciprocating vertical direction.

It will be appreciated that the unique press frame design used permits the drive shaft 65 and also the crank shaft 55 to be made much shorter than in conventional press designs. Since the press drive assembly 22 is a self-contained bench assembled unit, it can be designed to be very compact, eliminating the need for a long drive shaft.

The motor 78 drives the drive shaft 65 through a clutch-brake combination 80 of the type described in United States Patent 2,942,708. As seen in FIGURE 6, a stationary brake ring 82 is bolted by bolts 83 to the gear housing 77 which is bolted to support 33 which in turn is bolted and keyed to the side plates of the frame. A reaction member 86 in the form of a very thin disc of steel is attached to the brake ring by bolts 83 and 84.

A brake lining of conventional brake lining material 87 and 88 is riveted or otherwise bonded to the reaction member 86 on the radially outward surface on both sides thereof.

A center hub 90 having annularly extending flanges 91 is keyed to the drive shaft at 89 and will rotate with the drive shaft. The center hub 90 has a plurality of angularly positioned ports 92 or cylinders or cylindrical holes, for instance eight, which receive respectively a helical compression spring 93. Clamp members 95 having radially extending flanges 96 and secured together by bolts 97 and spacers 98 straddle the center hub 90. These clamp members 95 are free to move longitudinally with respect to the drive shaft but are rotationally locked to the hub member since the bolts and spacers pass through longitudinal openings or passages in the center hub 90.

In the lock or brake position wherein the pinion shaft is not free to rotate, the clamp member 95 is held against the reaction member under the bias of the helical compression springs 93.

Considering now the clutch assembly, a clutch disc 100 which is virtually the same as the brake disc or reaction member 86 as previously described is bolted to the fly wheel 101 by bolts 104 and has on its inner circumference a brake lining 102 similar to the brake lining 86 on the brake disc. In addition to the faces described above, there is a clutch face 103 at the rearward part of the clutch which is riveted to the rear clamp member 95. In this manner the slippage is dissipated over two surfaces 102 and 103 when the clutch goes into engagement.

A cap 106 is bolted to the fly wheel by bolts 107 to create an end 108 of a cylinder 110 which selectively receives air which creates a pressure which acts against a sliding metal face 111 which is in effect a piston.

The piston 111 slides in the cylinder 110 formed by the end face 108. The movement of the piston 111 is carried through bolts 113 and spacers 115 to a face plate 116 which engages brake lining 103 fixed on the rear clamp member 95. Hence the motion of the fly wheel 101 which is driven from the motor 78 through a V belt 79 which engages the fly wheel at 114 is taken through the spacers 115 to the face plate 116. Air pressure in the cylinder 110 imparts motion to the face plate 116 by virtue of the spacers 115 which pass through the fly wheel. The rear clamp member 95 is forced against the clutch disc 100 and the clutch disc 100 is grasped or tightened by the rear clamp member 95 and the center hub 90 so that the center hub 90 rotates and imparts angular motion to the drive shaft 65 to which it is keyed.

When the air pressure in cylinder 110 is released the helical springs 93 set the brake mechanism as previously described.

A plurality of assisting helical compression springs 120 individually surround the bolts 113 and spacers 115 and assist in retracting the piston 111 and face plate 116 from engagement with the rear clamp member 95.

A quick air release mechanism 121 is used for rapidly releasing air pressure in the cylinder 110. Air is fed through a feed line 122 into the main cylinder 110 to move the piston 111 into a clutch engaging and brake releasing position. A helical compression spring 123 along with air pressure holds a piston 124 in position to close off the main air release port 125. As long as air pressure is sustained in the feed line 122 the clutch-brake mechanism will stay in the clutch engaged, brake released position since there is air pressure in cylinder 110.

In order to disengage the clutch and apply the brake, the air pressure in the feed line 122 is reduced and the air under pressure in the cylinder 110 allowed to pass back through the air feed line 122. The air pressure is reduced more rapidly in the interior of the piston 124 than it is in the main cylinder 110 since the air from the main cylinder 110 is throttled through an annular space 125' surrounding a shaft 126 journalled in bearing 127 in housing 128 which is fixed to and rotates with cap 106, extending from the face. This reduction of pressure on one side of the piston 124 results in the piston being moved away from the main cylinder 110 against the bias of the helical compression spring 123 whereby the main port 125 is uncovered to spill in a rapid manner the air from the main cylinder 110, thus allowing the main piston 111 to move from the clutch engaged position to the brake engaging position.

To dump the air pressure in the main cylinder 110 the air in the feed line is dumped by manipulating a three-way valve (not shown).

There is an intermediate lock-out position between the clutch engaged and the brake engaged position. A floating shaft 130 floats longitudinally with respect to the drive shaft 65 and extends in a longitudinal opening in the drive shaft 65. A radially extending key 131 is fixed in the floating shaft 130 and slides in longitudinally extending slots 132 in the main shaft. The floating shaft is positioned in a radial and thrust bearing 133 in an auxiliary piston 135 which rides inside a cylinder 136 formed within the main piston 111. In effect, there is a piston 135 within a piston 111 within a cylinder 110.

By means of the thrust and radial bearing 133, a thrust can be imparted to the floating shaft 130 by the inner piston 125. The inner piston 135 will, under air pressure in the inner cylinder 136, be forced up against the fly wheel at point 137 and will not move any further longitudinally. Since the inner piston and fly wheel rotate together, there is no slippage but merely a bearing at 137. In this position the key 131 will be forced against the clamp members 95 and will move the clamp members 95 longitudinally so that they are spaced exactly in between the brake disc 86 and the clutch disc 100. In this position the center hub 90 will not exert pressure against either of the two discs 95 or 100. In this position the fly wheel 106 can permissibly rotate but the shaft 65 will be totally disengaged from either the fly wheel 106 or the brake 86 and the crankshaft 55 will be able to be moved, for instance by hand, in any angular direction. In practice, in most instances, the fly wheel 101 is stopped when the crankshaft 55 is turned by hand.

In normal press operation, the lock-out position will not be used but the clutch will either be in engagement wherein the motor 78 will drive the main crankshaft 55 through the shaft 65 or the brake will be applied. Desirably, the motor 78 will be stopped when the brake-clutch assembly is placed in the lock-out position and in this position the crankshaft 55 can be rotated to move the ram 50 into any desired position.

In the operation of the brake-clutch mechanism, air is controllably admitted by an air control valve which allows air pressure to be selectively admitted or released. A separate valve is used for supplying air to the lock-out structure. The three-way valve is controlled and activated through a stylus mechanism of the type shown in copending application Serial No. 275,868, filed April 26, 1963. When the stylus is engaged in a template hole, a contact will be closed and air pressure will be allowed into the main cylinder 110 to engage the clutch. In this position, the brake will be released and the clutch will then drive the crankshaft 55 through 360 degrees. The drive shaft 65 will rotate a correspondingly greater number of revolutions since there is a speed reduction gear ratio between the drive shaft 65 and the crankshaft 55.

A rotary switch at the 360 degree position closes contacts which release the air pressure thus engaging the quick release mechanism, causing the clutch to disengage and the brake to apply.

The press is now ready for another round of another cycle of operation.

*Turret drive assembly 23*

The turret drive assembly 23 consists of a hand wheel 140 keyed at 141 on a shaft 142 journalled in the front of the frame on bracket 143 and connecting through a universal joint 145 to a shaft 146 which is connected at the other end to a universal joint 147 connected to the shaft 148 of a speed reducer 150. The input to the speed reducer is on a horizontal shaft 148 and the output is on a vertical shaft 151.

The speed reducer is supported on a plate 152 extending between the side plates held thereto by angle brackets 153. The vertical output shaft of the speed reducer connects through a coupling 155 to the lower turret 156 which is supported in bearings 157 mounted in the lower cross plate of the frame. The lower turret has fixed thereon a sprocket 158 engaging an endless sprocket chain 160. The sprocket chain 160 also engages a sprocket 161 keyed to a vertical lower backshaft 162 journalled in the lower cross plate.

The backshaft 162 has a take-up unit 163 which can longitudinally position the shaft toward the front or back of the frame.

The take-up unit assembly consists of a sliding journal 165 which is moved longitudinally by a thread and nut engagement 166 in the front plate of a frame. The take-up journal rides on guide rails 167 and is pivotally connected at 168 to an adjusting screw 170 having a collar 171 engaging a corresponding slot 172 in the take-up block. The adjusting screw passes through a threaded opening 173 in the front plate and is rotated by a suitable wrench which engages a nut portion 175 at the front of the screw.

A jam nut 176 threaded on the adjusting screw is tightened against the front plate at 177 to provide a fixed and locked relationship between the screw and the front plate. The take-up block has an inner bearing 178 adapted to receive the backshaft.

The lower backshaft connects to an upper backshaft 180 through a phase coupling 181 having a lower and upper half. The two halves of this phase coupling can be shifted slightly with respect to one another. In this manner, the two turrets can be adjusted so that they will be exactly in phase. The upper backshaft has keyed thereon a sprocket 182 which receives a sprocket chain 183 which engages a sprocket 185 mounted on the upper turret 186. An upper take-up unit 187 similar to the lower take-up unit is mounted on the upper backshaft to slide the shaft longitudinally toward the front or back of the frame.

In operation, the take-up units are positioned to provide the proper amount of tension in the sprocket chains 160 and 183. The hand wheel 140 is turned in a clockwise or counterclockwise direction to impart rotary motion to the speed reducer 150 which drives the lower turret. The rotary motion of the lower turret is imparted to the sprocket 153 which drives the lower chain 160 connected to the lower back sprocket 161 which in turn drives the upper back sprocket 182 through the upper and lower backshafts 162 and 180. The upper back sprocket 182 imparts corresponding motion to the sprocket chain 183 connected to the upper turret sprocket 185 which drives the upper turret in synchronous relation with the lower turret.

It should be understood that the turret drive assembly of the invention can be used with a power drive by connecting to the input shaft 148 of the speed reducer 150 a motor or other power drive which, through suitable controls, can be made to drive the reducer, and thus drive in synchronism the upper and lower turrets.

*Turret spindle assembly 25*

The turret spindle assembly 25 comprises an upper turret spindle 200 which is keyed to the upper turret 186. The upper turret spindle 200 is supported in an upper tapered roller bearing 201 and a lower tapered roller bearing 202 having the outer races of the said bearings fitted into a spindle housing 203 which is desirably welded to the upper cross plate. The tapered roller bearings are in opposed relationship to provide thrust as well as radial stability to the spindle by having the outer races resting at the ends 205 and 206 directed toward one another on machined shoulders 207 and 208 on the housing.

The upper turret is held at the lower end of the upper spindle by a disc washer 210, a lock washer 211 and a lock nut 212. A felt washer 213 is located between the spindle housing and the turret to keep the oil in and foreign matter out. A metallic spacer 215 is interposed between the lower bearing and the upper surface 216 of the upper turret. The upper and lower turrets have a plurality of arcuately spaced openings 217 adapted to receive punches 218 in the upper turret and dies in the lower turret.

The punches 218 in the upper turret are adapted to move in a vertical direction being keyed to the turret radially. The punches have the well known T head 220 at their upper end adapted to engage a corresponding T slot 221 on the ram when the turret is moved into position.

*Index pin assembly 24*

The index pin assembly 24 is positioned behind the turrets and adapted to engage openings 230 bushed with hardened steel inserts 231 precisely located with respect to the centers of the punch holder bores in the turrets to exactly position the turrets. There is an index assembly 232 and 233 for the upper turret and for the lower turret respectively.

The upper turret index assembly 232 is comprised of a housing 235, a housing cover 236 and a support 237 on the frame for the housing. An index pin 238 having a tapered forward end 240 and a rectangular or square cross section rearward end 241 is slidably positioned in the housing. Vertical wear strips 242 and horizontal wear strips 243 are positioned within the guiding surfaces of the housing to provide a rectangular channel or in effect a square cross section channel for the movement of the index pin.

The index pin 238 should have a tapered forward end 240. The advantage of the tapered end is that it is subject to less wear, and that it permits the pin to pull the turret into position over a greater angular distance, so that the turret need not be accurately positioned by the turret drive before the pin can be fired.

The wear on the wear strips can be compensated for by either shimming at 245 or replacing the wear strips. The wear strips can be machined to large tolerances and then adjusted by shims to provide proper clearances for the motion of the index pins.

Considering that the critical dimension is the horizontal dimension since this arcuately positions the turret when the index pins are in engagement with the turret, the emphasis can be placed on very close tolerances in these vertical wear strips.

The vertical dimension of the turret is fixed by virtue of the spindle arrangement so that in the index pin assembly of the present invention, the horizontal dimension can be made very critical by reducing clearances to the greatest possible degree, while at the same time allowing a relatively greater tolerance in the vertical. This greater tolerance in the vertical direction also provides for compensating for any misalignment vertically which may be encountered in the vertical run-out. Thus, by means of the structure of the present index pins a compensation can be made for any vertical displacement at the circumference of the turret.

The index pin is moved longitudinally by an air cylinder 246 having a piston rod 247 connected to a cam link 248 which pivotally connects at 250 to a yoke 251 which pivotally connects at 252 to the extension 253 of the index pin.

By this arrangement, the index pin can be radially displaced to a considerable extent by shimming the wear strips without causing binding by misalignment of the piston of the air cylinder. In other words, the yoke 251 compensates and allows the longitudinal axis of the index pin to be radially displaced from the longitudinal axis of the piston and piston rod.

In operation, the cylinder 246 is energized to extend the piston rod 247 and move the index pin 238 longitudinally forward into engagement at its tapered end 240 with a bushed opening 230 in the turret 232 to bring the turret 232 into exact arcuate alignment subsequent to a rough angular alignment made with the turret drive assembly 23.

*Rotary limit switch and lubrication pump assembly 27*

The switch and lubrication pump assembly is supported on a plate 260 mounted on a bracket 261 attached to the side plate. The assembly consists of a shaft extension 262 at the rearward end of the main crankshaft and sealed by seal 263 fixed to the gear housing 77. The short shaft 262 is connected through a universal joint 267 to a long shaft 268 which is connected through a flexible coupling 270 to a short shaft 271 which is journalled in pillow blocks 272. The short shaft carries a sprocket 273 keyed thereon which engages a sprocket chain 275 which engages a second sprocket 276 keyed on the shaft 277 of a rotary limit switch 278.

The rotary limit switch 278 is mounted on a bracket 280 bolted to the side plate of the frame. The limit switch connects to a flexible coupling 281 which connects to a lubricator 282. As the crankshaft rotates the limit switch 278 and lubrication pump 282 assembly are driven through the shafts and universal joints and the sprockets and sprocket chains.

The press air and lubrication assembly

The press air and lubrication piping assembly comprises a plurality of piping networks which include for instance the air supply 285 to the index pin cylinders, and the air supply 286 to the brake-clutch combination. In addition, there is a suitable gauge 288 mounted in front of the press to indicate the air pressure.

The lubrication system consists of a lubrication piping to the various working parts of the press which include the spindle housings, the crankshaft bearings, the drive shaft bearings and the ram bearings.

Electrical system

Considering the electrical arrangement as set forth in FIGURE 10, there is shown a three-phase electrical supply line of a suitable voltage comprising leads 301, 302 and 303. The leads connect through a suitable three-pole disconnect switch 305 through fuses 306 through magnetic starter 307 to a suitable electric motor 78, for instance, a 2 horse power squirrel cage polyphase induction motor.

The primary of a step down transformer 308 is connected to leads 301' and 303'. Lead 310 connects from one terminal of the secondary coil of transformer 308 to a ground 311 on the machine. The other terminal is connected to lead 312 through fuse 313 through cabinet door 360 operated switch 315 through air pressure switch 316 to lead 317. In this manner, the circuit is automatically broken when cabinet door 360 is opened, thus providing a safety interlock.

A series of parallel circuits extend between leads 317 and 310. Circuit 318 includes switch 320 and brake release solenoid 321. Circuit 322 includes "stop" push button switch 232 and "start" push button switch 325, switch 320, press drive starter 325 and motor overload protection elements 326 and 327. One terminal of circuit 328 is connected to circuit 322 at 330 through normally open relay contact 331-1 through clutch valve solenoid 332 to circuit 310 at 333. Line 335 connects between circuit 322 at 336 and line 328 through normally open interlock 325-1 of the press drive starter 325. Line 337 connects to line 328 at 338 through stylus lock solenoid 340 to line 310 at 341.

Circuit 342 connects through clutch switch 343 to selectively circuit 345' or circuit 346 having in series therein normally open relay contacts 331-2. Line 345 has in series therein stylus trip switch 346, pins control switch 347, "pins in" indicating switches 348 and 350, top dead center switch 351, normally closed relay contacts 352-1 and relay 331.

Circuit 353 connects from circuit 345 through normally open relay contacts 352-2 and through relay 352. Circuit 353' connects though switch 347 through normally closed relay contacts 331-3 and through "pins out" solenoid 355.

Operation

Considering the operation of the press of the invention, all the press functions except operation of the line disconnect switch 305 are controlled from the operator's position in front of the gauging table. The main drive motor 78 is started by pushing button 325 and stopped by push button 323.

The press control circuits are interlocked with the 110 volt supply 310 and 312 through air pressure switch 316. The pressure switch 316 is set for operation at, for instance, a 20 pounds per square inch differential with the switch closing at approximately 85 pounds per square inch and opening at 65 pounds per square inch. This insures adequate starting pressure while the operating differential prevents loss of control due to surges during operation.

The press trip will not operate until certain conditions have been fulfilled. Switch 320 must be in the "automatic" position shown in FIGURE 10 and the main drive motor 78 must be operating. The turret index pins 238 must be fully seated in the turret bushings 231. This condition is controlled by the "pins in" limit switches 348 and 350 mounted near the rear piston rod extensions of the air cylinders operating the upper and lower pins. Adjustable trip dogs are set to operate the limit switches when the ends are fully inserted in the turret bushings. The crankshaft 55 must be on top dead center and is registered in this position by the "top dead center" switch 351. This switch is located in the rotary limit switch 278. The switch 351 remains closed when the crankshaft is approximately within plus or minus 7 degrees of top dead center position.

With the above conditions satisfied, the press may be tripped. The operator depresses a stylus 11 on gauge table 10 which closes switch 346. The stylus may be of the type disclosed in copending application Serial No. 275,868, filed April 26, 1963. This energizes relay 331 through the normally closed contacts of switch 347, the "pins in" limit switches 348 and 350, the "top dead center" limit switch 351, and the normally closed relay contacts 352-1.

Contact 331-2 locks in relay 331 through clutch switch 343. Contact 331-3 opens, preventing accidental operation of the "pins out" solenoid 355. Normally open contact 331-1 closes, energizing the clutch valve solenoid 332 which passes air under pressure to feed line 122 of the brake-clutch combination and energizes the stylus lock solenoid 340. The crankshaft 55 starts rotating while the stylus is held in position for the duration of the punching cycle by the stylus lock solenoid 340. As the crankshaft 55 rotates, the ram 50 carries the punch into and through the workpiece.

After 270 degrees of crankshaft rotation, clutch switch 343 is momentarily actuated. Relay 331 is deenergized and relay 352 is energized. Contacts 331-2, 331-1, and 352-1 open and contacts 331-3 and 352-2 close.

Contact 331-1 deenergizes the clutch solenoid 332 and reduces the pressure to feed line 122 of the brake-clutch combination wherein the clutch drive is disengaged and the brake is applied. Contact 331-1 also deenergizes the stylus lock solenoid 340.

Contact 352-2 locks in the single stroke relay 352 through foot switch 347 and stylus trip switch 346.

Contact 352-1 locks out relay 331, preventing the press from tripping a second time.

The operator releases the stylus switch 346, deenergizing relay 352. Contact 352-2 opens, contact 352-1 closes. This prepares the circuit for the next tripping sequence.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a turret press, a press frame comprising a weldment having a pair of vertically disposed parallel side plates, an upper and a lower horizontal cross plate welded to said side plates for supporting an upper and lower turret respectively, an upper and a lower vertical cross plate extending vertically between and welded to said side plates and also welded to said horizontal cross plates, and said upper vertical cross plate having a horizontal keyway adapted for supporting a main drive support member extending parallel to said upper vertical cross plate.

2. In a turret press, a press frame comprising a weldment having a pair of vertically disposed parallel side plates, an upper and a lower horizontal cross plate welded to said side plates, an upper and lower vertical cross plate extending vertically between and welded to said side plates and also welded to said horizontal cross plates, and a horizontal keyway cut into said upper vertical cross plate; a removable main drive support member extending parallel to said upper vertical cross plate and keyed to it by means of a key member and said horizontal keyway whereby all forces imparted to the press ram are transmitted to the side plates through the key member; a press drive assembly journalled in said main drive support member; an upper turret assembly removably supported on said upper horizontal cross plate; a lower turret assembly removably supported on said lower horizontal cross plate; a bolster filling the vertical gap between the lower turret in said lower turret assembly and between said lower vertical cross plate whereby all forces imparted to the lower turret are transmitted to the side plates through the bolster; and a turret drive assembly whereby said upper and lower turrets are rotated in synchronism.

3. A press of claim 2, wherein the press drive assembly comprises a crankshaft journalled in the main drive support member, a pitman journalled on the crankshaft, a ram pivoted on the pitman and journalled in the main drive support member, a gear fixed on the crankshaft, a drive shaft in engagement with the gear, combination brake-clutch means in driving engagement with the drive gear, and power means for driving the brake-clutch combination.

4. A press of claim 2, wherein the turret drive assembly comprises a backshaft, upper and lower sprockets on the backshaft, a first sprocket on the upper turret, a second sprocket on the lower turret, an endless sprocket chain in engagement with the upper backshaft sprocket and the first sprocket, a second endless sprocket chain in engagement with the lower backshaft sprocket and the second sprocket, and means for driving the lower turret.

5. A press of claim 4, wherein said backshaft comprises two halves connected by a phase coupling, whereby the two turrets can be adjusted to be exactly in phase.

6. A press of claim 4, wherein said backshaft is connected to said upper and lower horizontal cross plates by means of two take-up units, whereby the tension in said sprocket chains can be adjusted.

7. A press of claim 2, in combination with an index pin assembly comprising circumferentially spaced openings in each of the turrets, an upper and lower index pin, each of which is adapted to selectively engage one of said openings, said index pins having a tapered forward end and a rectangular cross section rearward end, guide means including vertical wear plates and horizontal wear plates for engaging the sides of said rectangular cross section of said index pin, and cylinder means for selectively longitudinally moving said pin into one of said openings.

8. A press of claim 7, wherein said wear plates include shim means for selectively adjusting said plates.

References Cited by the Examiner
UNITED STATES PATENTS

| | | | |
|---|---|---|---|
| 1,940,883 | 12/33 | Rollings | 83—552 |
| 1,971,955 | 8/34 | Hoelscher | 192—110 |
| 2,159,326 | 5/39 | Harwood et al. | 192—110 |
| 2,363,208 | 11/44 | Sulzer | 83—552 |
| 2,701,017 | 2/55 | Wiedemann | 83—552 |
| 2,748,864 | 6/56 | Ewaldson et al. | 83—552 |
| 2,779,448 | 1/57 | Lambach et al. | 192—18 |
| 2,905,291 | 9/59 | Olson et al. | 192—110 |
| 2,942,708 | 6/60 | Eason | 192—18 |
| 3,049,038 | 8/62 | Friedland | 83—552 |

FOREIGN PATENTS 608,226  11/60  Canada.

ANDREW R. JUHASZ, *Primary Examiner.*

HUNTER C. BOURNE, Jr., *Examiner*